United States Patent [19]

Papalos

[11] Patent Number: 4,770,952

[45] Date of Patent: Sep. 13, 1988

[54] MAGNETIC RECORDING MEDIA DISPERSANTS

[75] Inventor: John G. Papalos, Ledgewood, N.J.

[73] Assignee: Diamond Shamrock Chemicals Company, Painesville, Ohio

[21] Appl. No.: 71,902

[22] Filed: Jul. 10, 1987

Related U.S. Application Data

[62] Division of Ser. No. 844,978, Mar. 27, 1986.

[51] Int. Cl.$^4$ .............................. G11B 5/71
[52] U.S. Cl. .................... 428/694; 427/44; 427/54.1; 427/128; 427/131; 428/695; 428/900; 428/704; 252/62.54
[58] Field of Search .............. 558/182, 114, 92; 428/694, 695, 900, 704; 427/128, 44, 54.1, 131; 252/62.54; 360/134–136

[56] References Cited

U.S. PATENT DOCUMENTS

| | | | |
|---|---|---|---|
| 3,144,352 | 8/1964 | Talley | 117/138.8 |
| 3,647,539 | 3/1972 | Weber | 117/235 |
| 3,855,364 | 12/1974 | Steckler | 260/952 |
| 3,957,918 | 5/1976 | Dickie | 260/883 |
| 4,382,135 | 5/1983 | Sinka | 526/301 |
| 4,515,930 | 5/1985 | Omura | 526/276 |
| 4,526,837 | 7/1985 | Ohtsuki | 428/425.9 |
| 4,540,627 | 9/1985 | Ishizawa | 428/328 |
| 4,556,604 | 12/1985 | Ohbayashi et al. | 428/323 |
| 4,663,184 | 5/1987 | Hegel | 427/128 |

FOREIGN PATENT DOCUMENTS

60-208313  6/1985  Japan .
131620  7/1985  Japan .

*Primary Examiner*—Ellis P. Robinson
*Attorney, Agent, or Firm*—Ernest G. Szoke; Henry E. Millson, Jr.; Neal T. Levin

[57] ABSTRACT

Reactive dispersants for magnetic recording media are prepared by sequentially phosphating and esterifying or esterifying and phosphating alkoxylated alcohols having at least two carbon atoms and at least two hydroxyl groups. The phosphating agent can be phosphorus oxychloride while the esterifying agent can be acrylic acid.

8 Claims, No Drawings

MAGNETIC RECORDING MEDIA DISPERSANTS

This application is a division, of application Ser. No. 844,978, filed Mar. 27, 1986.

BACKGROUND OF THE INVENTION

1. Field of the Invention

This invention relates to a magnetic recording media dispersants and more particularly to reactive dispersants for magnetic particles in the coating of magnetic media such as tapes, cassettes and the like.

2. Description of the Prior Art

Magnetic recording media products such as magnetic tapes, reels, cassettes, cartridges, flexible disks and cards have been developed for information storage, logging, dictation, entertainment and other applications. Magnetic tape has become the principal recording medium for information storage because it is permanent, versatile, erasable, reusable and high capacity.

The two basic components in a magnetic recording medium are a non-magnetic support or substrate and a coating on the support which contains finely divided magnetic particles. Polyethylene terephthalate, a polyester, is the most commonly used support. The coating on the support is usually composed of fine particles of a ferri-magnetic material embedded in a matrix of organic polymer.

Manufacture of magnetic tape involves formulating a coating composition, dispersing magnetic particles in the composition, preparing a support, coating the support with the composition, orienting the particles, drying, curing, testing and packaging.

For a magnetic tape to perform, the magnetic particles must be thoroughly and completely dispersed in the coating composition. The dispersant aids in deagglomeration of the magnetic particles. Individual particles should be separated to the maximum possible degree because tape performance depends on dispersion.

U.S. Pat. No. 3,144,352—Talley, issued Aug. 11, 1964, describes use of lecithin as the dispersant for magnetic particles in a coating composition for magnetic tape. Lecithin is one of the most common dispersants. Lead naphthenate, calcium naphthenate and N-alkyl trimethylenediamines are also used as dispersants.

U.S. Pat. No. 3,647,539—Weber, issued Mar. 7, 1972, describes use of a tri lower alkyl polypropyleneoxy quaternary ammonium compound as the dispersant in a coating composition containing magnetic pigments such as gamma ferric oxide with carbon particles in a liquid binder resin.

U.S. Pat. No. 4,556,604—Ohbayashi et al, issued Dec. 3, 1985 describe use of a phosphate ester (GAFAC RE-610, a free acid of a complex organic phosphate ester having an aromatic hydrophobe base and not known to copolymerize under ultraviolet or electron beam radiation) in a coating composition referred to as a magnetic paint for magnetic tape.

SUMMARY OF THE INVENTION

A magnetic recording media reactive dispersant is prepared from an alkoxylated alcohol having at least two hydroxyl groups by partially esterifying same with a phosphating agent and then completing esterification with an ultraviolet or electron beam curable anionic vinyl monomer or vice versa. The dispersant may be prepared from an alcohol having from two to six hydroxyl groups, an alkylene oxide having from two to four carbon atoms, a phosphating agent such as phosphorus pentoxide ($P_2O_5$), phosphorus oxychloride ($POCl_3$), polyphosphoric acid or the like and an ultraviolet or electron beam curable anionic vinyl monomer such as acrylic or methacrylic acid.

The reactive dispersant is added to a coating composition for the non-magnetic substrate of the magnetic recording medium. A typical coating composition contains dispersant, magnetic particles, solvent, binder resin and lubricant. If desired, an antistatic agent, abrasive or other additives may be incorporated in the composition. After the coating composition is applied to the substrate, the wet coated substrate is heated to remove solvent and cured using ultraviolet or electron beam radiation thereby becoming immobilized in the coating. As a consequence, the cured dispersant does not migrate to the surface where it could foul recording and/or reproducing heads.

Sufficient reactive dispersant is added to the coating composition to diperse magnetic particles uniformly throughout the composition. From about 2% to about 10% by weight of the dispersant based on the weight of nonvolatiles in the coating composition may be added with from about 3% to about 5% by weight being preferred.

DESCRIPTION OF PREFERRED EMBODIMENTS

The reactive dispersant is one or a mixture of a partially phosphated, partially acrylated alkoxylated alcohol having from two to twenty carbon atoms and at least two hydroxyl groups. More specifically, it is a phosphated acrylate of an alkoxylated alcohol derived from at least one alcohol having from two to twenty carbon atoms and from two to six hydroxyl groups alkoxylated with from about one to about ten moles of at least one alkylene oxide having from two to four carbon atoms per hydroxyl group of said alcohol, said alkoxylated alcohol (1) esterified with at least one phosphating agent so that from about 20% to about 80% of said alkoxylated groups are reacted with phosphating agent, the balance of said alkoxylated groups esterified with at least one ultraviolet or electron beam curable anionic vinyl monomer of (2) esterified with at least one ultraviolet or electron beam curable anionic vinyl monomer so that from about 20% to about 80% of said alkoxylated groups are reacted with ultraviolet or electron beam curable anionic vinyl monomer, the balance of said alkoxylated groups esterified with at least one phosphating agent.

The dispersant is reactive or curable by ultraviolet or electron beam radiation. Its double bond can be reacted with the resin binder present in the coating composition or with the support. After reaction, the dispersant does not significantly migrate or exude to the coating surface to foul recording or reproducing heads.

In addition, the desirable cured films, or recording tapes, exhibit hardness, gloss and non-tackiness.

The alkoxylated alcohols employed to prepare the reactive dispersant are prepared from alcohols having from two to twenty carbon atoms, preferably from three to six carbon atoms, and having from two to six hydroxyl groups. Useful alcohols include ethylene glycol, propylene glycol, butylene glycol, pentamethylene glycol, neopentyl glycol, 1,6-hexane diol, heptane diol, glycerol, trimethylol propane, pentaerythritol, erythritol, arabitol, mannitol, dodecane diol and $C_{13}$ to $C_{16}$ diols or the like. Isomers or homologs of the above alcohols may be used. The alcohols have preferably from 3 to 6 carbon atoms.

Alkoxylation of the alcohol is accomplished by well known procedures. The alkylene oxide may be ethylene oxide, propylene oxide, butylene oxide, their isomers, their mixtures or the like. From about one to about ten moles of at least one alkylene oxide is condensed with each hydroxyl group in the alcohol. These alkoxylated alcohols are also known as polyether polyalcohols.

Esterification of the alkoxylated alcohol is accomplished by sequential esterification, (1) first with phosphating agent and then with ultraviolet or electron beam curable anionic vinyl monomer or (2) first with ultraviolet or electron beam curable anionic vinyl monomer and then with phosphating agent. There is employed sufficient phosphating agent to partially esterify at least about 20% to about 80% of the alkoxylated groups and then sufficient ultraviolet or electron beam curable anionic vinyl monomer to esterify the balance of the alkoxylated groups or sufficient ultraviolet or electron beam curable anionic vinyl monomer to partially esterify at least about 20% to about 80% of the alkoxylated groups and then sufficient phosphating agent to esterify the balance of the alkoxylated groups. On completion of esterification, the alkoxylated alcohol is completely esterified and contains at least one ultraviolet or electron beam curable vinyl monomer group and at least one phosphate group.

Esterification with a phosphating agent may be carried out at a temperature of from about 20 deg. C. to about 150 deg. C. with temperatures from about 20 deg. C. to 100 deg. C. being preferred. Esterification with an anionic vinyl monomer may be carried at about 60 deg. C. to about 180 deg. C. with temperatures from about 60 deg. C. to about 120 deg. C. being preferred. These esterifications may be carried out with or without inert solvent. If desired, a catalyst such as methane sulfonic acid or the like may be used. Phosphating agents such as phosphorus pentoxide, phosphorus oxychloride, polyphosphoric acid or the like may be used. The preferred phosphating agent is phosphorus oxychloride which, upon phosphation, yields triphosphate esters. The other phosphating agents yield mono and di esters.

The anionic ultraviolet or electron beam curable vinyl monomers are vinyl containing compounds that are easily polymerizable when subjected to ultraviolet or electron beam radiation. Thus vinyl monomers which are not polymerizable under ultraviolet or electron beam radiation curing procedures are not included in this invention. Anionic vinyl monomers such as acrylic acid, methacrylic acid or the like may be used.

Of the above reaction dispersants, those triphosphate acrylate esters (derived from phosphorus oxychloride) prepared from $C_2$ to $C_{20}$ alkoxylated alcohols, the preferred being $C_5$ and $C_6$ alkoxylated alcohols and alkoxylated glycerol, and having from 2 to 6 hydroxyl groups, are novel. Also novel are those mono and diphosphate acrylate esters prepared from $C_5$ to $C_{20}$ alkoxylated alcohols and alkoxylated glycerol, the preferred being $C_5$ and $C_6$ alkoxylated alcohols and alkoxylated glycerol, and having from 2 to 6 hydroxyl groups.

The coating compositions also contain conventional binder resin, solvent, magnetic particles, lubricants and other additives in addition to the reactive dispersing agents. Useful binder resins include polyurethane acrylates. They are well known and derived from the polyester polyol or the polyether polyol. For example, a polyester polyol can be prepared via the reaction of adipic acid with ethylene glycol or butylene glycol to form a polyester backbone which is subsequently reacted with an aromatic or aliphatic isocyanate to form the urethane. The urethane is then capped with hydroxylethyl acrylate or hydroxylpropyl acrylate to obtain the reactive portion of the binder. Similarly, a polyether polyol is prepared via reaction of various polyols and alkylene oxide such as ethylene oxide and propylene oxide to form a polyether backbone. For example, bis-phenol A, glycerine or trimethylol propane is reacted with alkylene oxide to form the polyether polyol. The polyether is then reacted with an alphatic or aromatic isocyanate to form the urethane and then capped with hydroxyethyl acrylate or hydroxypropyl acrylate to form the reactive portion of the binder. These resins should be soluble in coating solvents such as tetrohydrofuran, cyclohexanone, methyl ethyl ketone, methyl isobutyl ketone, toluene or the like.

Magnetic particles include gamma ferric oxides (e.g. gamma $Fe_2O_3$), doped iron oxides, chromium dioxide, metallic particles containing elemental iron, cobalt and/or nickel or the like.

Lubricants such as fatty acids, silanes, fluorinated hydrocarbons, silica or the like may be also present.

Other additives such as alumina, chromia, fungicides or the like may also be present. These additives have been used extensively in coating compositions for magnetic media.

Preparation of the reactive dispersants are described in greater detail below in the examples.

For a fuller understanding of the nature and advantages of this invention, reference may be made to the following examples. These examples are given merely to illustrate the invention and are not to be construed in a limiting sense. Temperatures are in deg. C. Ethylene oxide and propylene oxide are referred to as EO and PrO, respectively.

EXAMPLE I

Phosphated acrylates of one mole neopentylglycol+2 moles EO using phosphorus oxychloride

A. Phosphation

Into one liter flask equipped with stirrer, heating mantle, condenser and thermometer, was charged 100 grams (1.0 equivalent) of neopentylglycol alkoxylated with approximately 2 moles of EO and having a hydroxyl number of 561 and 100 grams of toluene. Then 12.7 grams (0.083 mole) of phosphorus oxychloride was added slowly at 20–30 deg. C. while trapping the gaseous by-products in a scrubber containing 10% by weight NaOH. After addition, the reaction mixture was heated at 30–35 deg. C. for 1.5 hours and at 100 deg. C. for three hours where a constant weight of the reaction mixture was obtained. It was then cooled to room temperature.

B. Esterification

To the phosphated product from Part A was added 0.05 gram of triphenyl phosphite, 0.05 gram nitrobenzene, 0.20 gram methyl ether of hydroquinone, 54.0 grams (0.75 mole) of acrylic acid and 4.0 grams of methane sulfonic acid. The flask then was equipped for azeotropic distillation under slight vacuum and nitrogen atmosphere. The reaction mixture was heated to distill azeotropically at 95–100 deg. C. Azeotropic distillation was continued until no more water was collected in the receiver which represented a 90% conversion of polyol to the corresponding phosphated acrylated ester. Solvent was then removed via distillation at 90 deg. C. and 25 mm pressure.

The above phosphation and esterification procedures were used to prepare phosphated acrylates representing 50% and 75% phosphation based on actual hydroxyl numbers of the neopentylglycol alkoxylated with 2 moles EO. The table below gives parts by weight of $POCl_3$ and acrylic acid per 100 parts by weight of the ethoxylated neopentylglycol used in these above experiments. In each instance, phosphation was carried out first upon the alkoxylated neopentyl glycol followed by esterification with acrylic acid. (Note: The above example is repeated as the first line in the table below).

| % Phosphated | $POCl_3$ (wt.) | Acrylic Acid (wt.) | % Acrylated |
|---|---|---|---|
| 25 | 12.7 | 54.0 | 75 |
| 50 | 25.5 | 36.0 | 50 |
| 75 | 38.25 | 18.0 | 25 |

EXAMPLE II

Phosphated acrylates of one mole neopentylglycol +2 moles EO using phosphorus pentoxide

A. Phosphation

Into a reactor similar to that described in Example I, was charged 100 grams (0.5 mole) of neopentylglycol alkoxylated with approximately 2 moles of EO per mole and having a hydroxyl number of 561 and 100 grams of toluene and 0.1 gram of 50% by weight hypophosphorus acid. Then, under nitrogen atmosphere, 15.6 grams (0.11 mole) of phosphorus pentoxide was added slowly over a thirty minute period at 25-30 deg. C. The reaction mixture was then heated at 100 deg. C. for three hours and cooled to room temperature. This procedure yielded a product representing a 33% phosphation based on the actual hydroxyl number of the ethoxylated neopentylglycol.

B. Esterification

To the phosphated product from Part A was charged 0.05 gram triphenyl phosphite, 0.05 gram nitrobenzene, 0.20 gram of methyl ether of hydroquinone and 47.0 grams (0.66 mole) of acrylic acid. The reaction flask was then equipped for azeotropic distillation. The reaction mixture was heated under slight vacuum and nitrogen atmosphere at 95-100 deg. C. to distill azeotropically. Distillation was continued until no more water was collected in the receiver which represented a 67% conversion based on the actual hydroxyl number of the ethoxylated neopentylglycol.

EXAMPLE III

Phosphated acrylates of one mole glycerol+3 moles PrO using 115% polyphosphoric acid method

A. Phosphation

Into a reactor similar to that described in Example I, there was charged 50 grams (0.485 equivalent) of glycerol propoxylated with approximately 3 moles of PrO and having a hydroxyl number of 545 and 50 grams toluene. Under nitrogen atmosphere, the charge was heated at 50 deg. C. Then 13.8 grams (0.08 equivalent) of 115% polyphosphoric acid was added at 60 deg. C. over a period of thirty minutes. The reaction mixture was heated at 100 deg. C. for three hours. It was then cooled to room temperature. This procedure yielded a 25% phosphation product based on the actual hydroxyl number of the propoxylated glycerol.

B. Esterification

To the phosphated product from Part A, there was added 0.02 gram triphenyl phosphite, 0.02 gram nitrobenzene, 3.2 grams methane sulfonic acid, 0.10 gram methyl ether of hydroquinone and 26.2 grams (0.364 equivalent) of acrylic acid. The esterification was then carried out as described in Example I. This procedure yielded a 75% acrylated ester based on the hydroxyl number of the propoxylated glycerol.

EXAMPLE IV

Phosphated acrylates of one mole glycerol+3 moles PrO using phosphorus oxychloride

A. Esterification

Into a reactor similar to that described in Example I, there was charged 50 grams (0.485 equivalent) of glycerol propoxylated with approximately 3 moles of PrO and having a hydroxyl number of 545, 50 grams of toluene, 0.05 gram of triphenyl phosphate, 0.05 gram nitrobenzene, 0.10 gram methyl ether of hydroquinone, 2.0 grams of methane sulfonic acid and 26.2 grams (0.3641 equivalent) of acrylic acid. Under an air atmosphere and slight vacuum, the reaction mixture was heated to distill azeotropically at 95-100 deg. C. The distillation was continued until no more water was collected in the receiver. This procedure yielded an acrylated product representing 75% conversion based on actual hydroxyl number of the propoxylated glycerol.

B. Phosphation

To the above ester, under a nitrogen atmosphere, there was added 6.2 grams (0.041 mole) of $POCl_3$ at 20-30 deg. C. The gaseous fumes were trapped in a scrubber containing a 10% by weight NaOH solution. At the end of the addition, the reaction mixture was heated at 30-35 deg. C. for 1.5 hours and at 100 deg. C. for three hours. The solvent was then removed via distillation at 85 deg. C. and 25 mm pressure under air atmosphere.

Procedures A and B above were used to prepare various phosphated acrylates of the propoxylated glycerol. In each instance esterification with acrylic acid was carried out first upon the propoxylated glycerol followed by phosphation with $POCl_3$.

The following table shows these products, percent phosphation, percent acrylation and parts by weight of the reactants per 50 parts of the propoxylated glycerol. (Note: The above example is repeated as the first line in the table below).

| % Phosphated | % Acrylated | $POCl_3$ (wt) | Acrylic Acid (wt) |
|---|---|---|---|
| 25 | 75 | 6.20 | 26.20 |
| 33 | 67 | 8.17 | 23.40 |
| 50 | 50 | 12.75 | 18.00 |
| 75 | 25 | 18.57 | 8.74 |

EXAMPLE V

Phosphated acrylates of one mole neopentylglycol+2 moles PrO using phosphorus oxychloride

A. Esterification

Into a reactor similar to that described in Example I, there was charged 50 grams (0.458 equivalent) of neopentylglycol propoxylated with approximately 2 moles of PrO having a hydroxyl number of 515, 50 grams of toluene, 0.02 gram triphenyl phosphite, 0.02 gram nitrobenzene, 0.10 gram methyl ether of hydroquinone, 2.0 grams of methane sulfonic acid and 24.77 grams (0.344 equivalent) of acrylic acid. The reaction mixture was heated to distill azeotropically at 95–100 deg. C. under an air atmosphere and slight vacuum until no more water was collected in the receiver. This procedure yielded an acrylated product representing 75% conversion based on the actual hydroxyl number of the propoxylated neopentylglycol.

B. Phosphation

To the above acrylated propoxylated neopentylglycol, under nitrogen atmosphere, there was added 5.8 grams (0.038 mole) of $POCl_3$ at 25–30 deg. C. The reaction mixture was then heated at 30–35 deg. C. for 1.5 hours and 100 deg. C. for 5.5 hours until a constant weight reaction mixture was obtained. During the reaction, gaseous by-products were collected in a scrubber containing a 10% by weight NaOH solution. At the completion of reaction, the solvent was removed via distillation.

Procedures A and B were used to prepare various phosphated acrylates. The following table gives these products, the percent phosphated, percent acrylated and parts by weight of the reactants per 50 parts of the propoxylated neopentyl glycol. In each instance, esterification with acrylic acid was carried out upon the propoxylated neopentyl glycol followed by phosphation with $POCl_3$.

The following table shows these products, percent phosphation, percent acrylation and parts by weight of the reactants per 50 parts of the propoxylated glycerol. (Note: The above example is repeated as the first line in the table below).

| % Phosphated | % Acrylated | POCl₃ (wt) | Acrylic Acid (wt) |
|---|---|---|---|
| 25 | 75 | 5.8 | 24.77 |
| 33 | 67 | 15.4 | 10.90 |
| 50 | 50 | 11.7 | 16.52 |
| 75 | 25 | 17.5 | 8.26 |

EXAMPLE VI

Phosphated methacrylate of one mole neopentylglycol + 2 moles EO

A. Phosphation

Into a reactor similar to that described in Example I, was charged 100 grams (0.5 mole) of neopentylglycol alkoxylated with approximately 2 moles of EO and having a hydroxyl number of 561 and 100 grams of toluene under nitrogen atmosphere. Then 25.5 grams of phosphorus oxychloride was added at 25–30 deg. C. with stirring while trapping the gaseous fumes in a scrubber containing a 10% by weight sodium hydroxide solution. The reaction was then heated at 30–35 deg. C. for 1.5 hours at 100 deg. C. until a constant weight was obtained. This procedure yielded a product representing a 50% phosphation based on the actual hydroxyl number of the ethoxylated neopentylglycol.

B. Esterification

To the phosphated product from part A was charged 0.05 gram bisphenyl phosphite, 0.05 gram of methylether of hydroquinone, 0.05 gram nitrobenzene and 2.0 grams methanesulfonic acid and mixed at room temperature for thirty minutes. Then 43.0 grams of methacrylic acid was added and the reaction mixture was heated under slight vacuum and nitrogen atmosphere at 95–100 deg. C. to distill azeotropically. Distillation was continued for seventeen hours until no more water was collected in the receiver which represented a 50% conversion based on the actual hydroxyl number of the ethoxylated neopentylglycol.

EXAMPLE VII

Phosphated acrylate of one mole pentaerythritol +4 moles PrO

A. Esterification

Into a reactor similar to that described in Example I, there was charged 50.5 grams (0.5 equivalent) of pentaerythritol propoxylated with approximately 4 moles of PrO having a hydroxyl number of 555, 50 grams of toluene, 0.05 gram triphenylphosphite, 0.05 gram nitrobenzene, 0.10 gram of methylether of hydroquinone, 2.0 grams methanesulfonic acid and 27.0 grams (0.375 equivalent) of acrylic acid. Under an air atmosphere and slight vacuum, the reaction mixture was heated to distill azeotropically at 95–100 deg. C. The distillation was continued until no more water was colleced in the receiver. This procedure yielded an acrylated product representing 75% conversion based on actual hydroxyl number of the propoxylated pentaerythritol.

B. Phosphation

To the above ester, under nitrogen atmosphere, there was added 6.4 grams (0.040 equivalent) of $POCl_3$ at 20–30 deg. C. while trapping the gaseous fumes in a scrubber containing a 10% by weight NaOH solution. At the end of addition, the reaction mixture was heated at 30–35 deg. C. for 1.5 hours at 100 deg. C. for three hours. The solvent was then removed via distillation at 85 dec. C. under 25 mm pressure under air atmosphere.

Procedures A and B were used to prepare various phosphated acrylates of the propoxylated pentaerythritol.

The following table shows these products, percent phosphation, percent acrylation and parts by weight per 50 parts of the propoxylated pentaerythritol. In each instance, esterification with acrylic acid was carried out first upon the propoxylated pentaerythritol followed by phosphation with $POCl_3$. (Note: The above example is repeated as the first line the table below).

| % Phosphated | % Acrylated | POCl₃ (wt) | Acrylic Acid (wt) |
|---|---|---|---|
| 25 | 75 | 6.4 | 27.00 |
| 50 | 50 | 12.8 | 18.00 |
| 75 | 25 | 19.1 | 9.00 |

EXAMPLE VIII

Several phosphated acrylates were evaluated as dispersants in the following coating formula:

| Ingredient | % by weight |
| --- | --- |
| cyclohexanone | 42.3 |
| dispersant (100% solids) | 1.7 |
| binder resin* (urethane acrylate 100% solids) | 16.0 |
| magnetic media** | 40.0 |

*DeSoto 2764-70-92 (52% by weight active)
**Iron oxide - Hercules HGC-603

Coating compositions containing the above ingredients, each with a different phosphated acrylate, were prepared in the following manner.

One hundred gram samples of the above coating formula, each sample containing one of the phosphated acrylates shown in the table below, were prepared as slurries and added to a 300 ml shaker mill along with 280 grams of ⅛" carbon steel shot (twin Red Devil shaker). The mill was shaken for one hour. The samples were separated from the steel shot, applied to 3 mil Mylar film (du Pont) as ½ mm coatings using a 0.003 inch Bird applicator and then over dried for 3 minutes at 60 deg. C.

Film gloss of each film was measured using a Gardner Glossgard at a 60 deg. angle. The higher the gloss of the coating, the finer the particles and the more uniform the dispersion. Results of these tests are shown in Table I below.

TABLE I

| Phosphated Acrylates as Dispersants for Magnetic Media Use | | | |
| --- | --- | --- | --- |
| Phosphated Acrylates of Example | % Phosphated | % Acrylated | Gloss at 60 deg. Dispersability |
| 1 | 25 | 75 | 22 |
| 1 | 50 | 50 | 32 |
| 1 | 75 | 25 | 20 |
| 2 | 33 | 67 | 18 |
| 4 | 25 | 75 | 10 |
| 4 | 33 | 67 | 23 |
| 4 | 50 | 50 | 25 |
| 4 | 75 | 25 | 28 |
| 3 | 25 | 75 | 27 |
| 5 | 25 | 75 | 14 |
| 5 | 33 | 67 | 26 |
| 5 | 50 | 50 | 25 |

TABLE I-continued

| Phosphated Acrylates as Dispersants for Magnetic Media Use | | | |
| --- | --- | --- | --- |
| Phosphated Acrylates of Example | % Phosphated | % Acrylated | Gloss at 60 deg. Dispersability |
| 5 | 75 | 25 | 22 |

The foregoing gloss data demonstrate that the reactive dispersants display superior dispersability.

EXAMPLE IX

Several phosphated acrylates were evaluated by extraction studies with respect to their ability to react in the coating composition and not migrate or exude to the coating surface.

Coating compositions and preparation of films using same were prepared as described in Example VIII above. The films were cured by electron beam radiation using a CB-150/15/180L laboratory electron beam unit manufactured by Energy Sciences, Inc. Curing was accomplished with a dosage of 10 Megarads using 175 kilovolts and 6 milliamps.

Extraction data were obtained by the following procedure.

Approximately 4.0 grams of film sample were cut into small strips and placed inside a 2 oz. bottle containing a Polyseal cap liner. Fifty milliliters of diethyl ether were then added and the bottle and contents then placed in a wrist action shaker and the film samples extracted for sixteen hours. After the extraction period, the diethyl ether was filtered and the filtrate poured into a tared aluminum dish and then evaporated to dryness to obtain the weight of extractable material. The percentage of extractables was then calculated using the following equation:

$$\text{Percentage of extractables} = \frac{\text{Weight of Extractables (gms)}}{\text{Weight of Film Sample (gms)}} \times 100\%$$

Extraction data obtained by the above described procedure are set forth in Table II below.

TABLE II

| | Phosphated Acrylate | | | | |
| --- | --- | --- | --- | --- | --- |
| | % Phosphate | % Acrylate | Film Sample wt. (gms) | Solids Extracted (milligrams) | % Extracted |
| Uncoated Mylar Film (Blank) | — | — | 3.8651 | 0.0 | 0.0 |
| GAFAC RE 610[1] | | — | 4.1566 | 4.7 | 0.11 |
| One mole pentaerythritol + 4 moles PO triacrylate[2] | 25 | 75 | 4.3125 | 2.8 | 0.065 |
| One mole pentaerythritol + 4 moles PO triacrylate[2] | 50 | 50 | 3.4546 | 3.1 | 0.090 |
| One mole neopentylglycol + 4 moles EO diacrylate | 75 | 25 | 4.4890 | 3.2 | 0.07 |
| One mole neopentylglycol + 4 moles EO diacrylate | 33 | 67 | 4.3413 | 2.4 | 0.055 |
| One mole neopentylglycol + 4 moles EO diacrylate | 25 | 75 | 4.7132 | 1.9 | 0.040 |
| One mole neopentylglycol + 4 moles EO diacrylate | 50 | 50 | 4.0989 | 1.5 | 0.036 |
| Pentaerythritol + 4 moles PO triacrylate | 50 | 50 | 4.1148 | 2.2 | 0.053 |
| One mole neopentylglycol + 4 moles EO diacrylate | 50 | 50 | 4.2354 | 1.9 | 0.045 |

TABLE II-continued

| Phosphated Acrylate | | Film Sample | Solids Extracted | % |
|---|---|---|---|---|
| % Phosphate | % Acrylate | wt. (gms) | (milligrams) | Extracted |
| (repeat) | | | | |

[1] Free acid of a complex organic phosphate ester having an aromatic hydrophobe base and not known to copolymerize under U.V. or E.B. radiation.
[2] Prepared by esterifying first and then phosphating with POCl$_3$. Remaining examples prepared by phosphating first with POCl$_3$ and then esterifying.

From the above extraction data, it can be seen that the reactive dispersants of this invention are not significantly extracted from the coatings in which they are present, thus indicating that the reactive dispersants became an integral part of the coating.

While the invention has been described with reference to certain specific embodiments thereof, it is understood that it is not to be so limited since alterations and changes may be made therein which are within the full and intended scope of the appended claims.

What is claimed is:

1. A magnetic recording medium comprising a non-magnetic support having a coating thereon containing finely divided magnetic particles, said coating containing, as a dispersant for said magnetic particles, a triphosphate acrylate ester of a condensate of
   one mole of at least one alcohol having at least two carbon atoms and a least two hydroxyl groups with from about one to about ten moles of at least one alkylene oxide having from two to four carbon atoms per hydroxyl group of said alcohol, said condensate esterified so that from about 20% to about 80% of hydroxyl groups of said condensate are esterified at about 20 deg. C. to about 150 deg. C. with phosphorus oxychloride, the balance of said hydroxyl groups esterified at about 60 deg. C. to about 180 deg. C. with at least one ultraviolet or electron beam curable anionic vinyl monomer, or from about 20% to about 80% of hydroxyl groups of said condensate esterified at about 60 deg. C. to about 180 deg. C. with at least one ultraviolet or electron beam curable anionic vinyl monomer, the balance of said hydroxyl groups esterified at about 20 deg. C. to about 150 deg. C. with phosphorus oxychloride
   which has been cured.

2. The magnetic recording medium of claim 1 wherein the ultraviolet or electron beam curable anionic vinyl monomer is selected from the group consisting of acrylic acid and methacrylic acid.

3. The magnetic recording medium of claim 1 wherein in said dispersant the alcohol is neopentylglycol, the alkylene oxide is ethylene oxide and the ultraviolet or electron beam curable anionic vinyl monomer is acrylic acid.

4. The magnetic recording medium of claim 1 wherein in said dispersant the alcohol is neopentylglycol, the alkylene oxide is ethylene oxide and the ultraviolet or electron beam curable anionic vinyl monomer is methacrylic acid.

5. A coating composition containing finely divided magnetic particles in a resin and as a dispersant for said magnetic particles, a triphosphate acrylate ester of a condensate of
   one mole of at least one alcohol having at least two carbon atoms and at least two hydroxyl groups with from about one to about ten moles of at least one alkylene oxide having from two to four carbon atoms per hydroxyl group of said alcohol, said condensate esterified so that from about 20% to about 80% of said hydroxyl groups of said condensate are esterified at about 20 deg. C. to about 150 deg. C. with phosphorus oxychloride, the balance of said hydroxyl groups esterified at about 60 deg. C. to about 180 deg. C. with at least one ultraviolet or electron beam curable anionic vinyl monomer, or from about 20% to about 80% of said hydroxyl groups of said condensate esterified at about 60 deg. C. to about 180 deg. C. with at least one ultraviolet or electron beam curable anionic vinyl monomer, the balance of said hydroxyl groups esterified at about 20 deg. C. to about 150 deg. C. with phosphorus oxychloride.

6. The coating composition of claim 5 wherein the ultraviolet or electron beam curable anionic vinyl monomer is selected from the group consisting of acrylic acid and methacrylic acid.

7. The coating composition of claim 5 wherein in said dispersant the alcohol is neopentylglycol, the alkylene oxide is ethylene oxide and the ultraviolet or electron beam curable vinyl monomer is acrylic acid.

8. The coating composition of claim 5 wherein in said dispersant the alcohol is neopentylglycol, the alkylene oxide is ethylene oxide and the ultraviolet or electron beam curable anionic vinyl monomer is methacrylic acid.

* * * * *